(12) United States Patent
Rakshit et al.

(10) Patent No.: US 10,965,864 B2
(45) Date of Patent: *Mar. 30, 2021

(54) PANORAMIC PHOTOGRAPH WITH DYNAMIC VARIABLE ZOOM

(71) Applicant: INTERNATIONAL BUSINESS MACHINES CORPORATION, Armonk, NY (US)

(72) Inventors: Sarbajit K. Rakshit, Kolkata (IN); James E. Bostick, Cedar Park, TX (US); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,807

(22) Filed: Nov. 18, 2019

(65) Prior Publication Data

US 2020/0154035 A1 May 14, 2020

Related U.S. Application Data

(63) Continuation of application No. 16/190,574, filed on Nov. 14, 2018, now Pat. No. 10,582,115.

(51) Int. Cl.
*H04N 5/232* (2006.01)
*H04L 29/08* (2006.01)
(Continued)

(52) U.S. Cl.
CPC ..... *H04N 5/23216* (2013.01); *H04N 5/23238* (2013.01); *H04N 5/23296* (2013.01);
(Continued)

(58) Field of Classification Search
CPC .......... H04N 5/23216; H04N 5/23238; H04N 5/23296; G06F 3/0488; G06F 3/0482; H04L 67/10
See application file for complete search history.

(56) References Cited

U.S. PATENT DOCUMENTS 9,538,078 B2   1/2017   Mehta et al.
9,736,365 B2   8/2017   Laroia
(Continued)

OTHER PUBLICATIONS

Peter Mell et al, The NIST Definition of Cloud Computing, National Institute of Standards and Technology, Publication 800-145, 2011, entire document.
(Continued)

*Primary Examiner* — Nam D Pham
(74) *Attorney, Agent, or Firm* — Patrick J. Daugherty; Daugherty & Del Zoppo Co., LPA

(57) ABSTRACT

Embodiments generate panoramic image data with variable zoom settings. Embodiments display for a camera lens a two-dimensional representation of a geographic area encompassing a geographic location of the camera and other geographic areas within a field of view of the lens. Embodiments determine geographic coordinate points for the geographic areas and capture panorama photograph data in response to rotation of the camera while dynamically changing a zoom setting of the lens to match distances from the camera lens to the geographic coordinate points determined for each of the different locations.

20 Claims, 5 Drawing Sheets

(51) Int. Cl.
*G06F 3/0488* (2013.01)
*G06F 3/0482* (2013.01)

(52) U.S. Cl.
CPC .......... *G06F 3/0482* (2013.01); *G06F 3/0488* (2013.01); *H04L 67/10* (2013.01)

(56) References Cited

U.S. PATENT DOCUMENTS 9,854,156 B1 12/2017 Manzari et al.
2002/0130955 A1* 9/2002 Pelletier ................. G03B 15/00
348/211.4

OTHER PUBLICATIONS

Chang, H. et al.; "Panning and Zooming High-Resolution Panoramas in Virtual Reality Devices"; UIST '17; Oct. 22-25, 2017, entire document.

Anonymously; "Method for Template-Based Panoramic Photograph Display on Mobile Device"; http;//ip.com/IPCOM/000240530D; Feb. 5, 2015, entire document.

Anonymously; "Method and System for Displaying Recommended Photographic Direction Visualization with Overlaid Panoramic View"; http://ip.com/IPCOM/0002310654D; Sep. 25, 2013, entire document.

Anonymously; "Method and System for Combining Images into a Composite Image from a Gathering"; http://ip.com/IPCOM/000223762D; Nov. 28, 2012, entire document.

Anonymously; "New Mechanism on Panoramic Imaging with Mobile Devices"; http://ip.com/IPCOM/000236232D; Apr. 14, 2014, entire document.

Erec Olson, Teaching Cameras to Zoom . . . "Intelligently", PureTech Systems, 2015, entire document.

U.S. Appl. No. 16/190,574, filed Nov. 14, 2018, File No. P201701071US01, Confirmation No. 1658.

* cited by examiner

PANORAMIC PHOTOGRAPH WITH DYNAMIC VARIABLE ZOOM

BACKGROUND

Panoramic photography refers to capturing images with horizontally elongated fields of view. Digital cameras may capture (create) a panoramic image in response to a user physically moving the camera lens or body along a specified direction while the camera captures image data, wherein internal software executes and combines the image data obtained at different vantage points into one image. Generally, an electronic image sensor captures a reference optical image sample data while the camera is moved by a user or automated mechanisms through an optical path, wherein optical image stabilization (OIS) components eliminate distortions to the image data cause by motion of the camera while capturing the panoramic image data, such as jittering vibrations imparted by a user operating the camera.

SUMMARY

In one aspect of the present invention, a computerized method includes driving a graphical user interface display to display to a user of a digital camera a two-dimensional representation of a plurality of different geographic areas that are within a scope of a field of view of a lens of the camera; determining geographic coordinate points for each of the different geographic areas and for a geographic location of the camera lens; and capturing panorama photograph data via the camera lens in response to rotation of the camera, while dynamically changing a zoom setting of the lens to match distances from the geographic coordinate point of the location of camera lens to the geographic coordinate points determined for each of the different geographic areas.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to drive a graphical user interface display to display to a user of a digital camera a two-dimensional representation of a plurality of different geographic areas that are within a scope of a field of view of a lens of the camera; determine geographic coordinate points for each of the different geographic areas and for a geographic location of the camera lens; and capture panorama photograph data via the camera lens in response to rotation of the camera, while dynamically changing a zoom setting of the lens to match distances from the geographic coordinate point of the location of camera lens to the geographic coordinate points determined for each of the different geographic areas.

In another aspect, a computer program product includes instructions for execution which cause a processor to drive a graphical user interface display to display to a user of a digital camera a two-dimensional representation of a plurality of different geographic areas that are within a scope of a field of view of a lens of the camera; determine geographic coordinate points for each of the different geographic areas and for a geographic location of the camera lens; and capture panorama photograph data via the camera lens in response to rotation of the camera, while dynamically changing a zoom setting of the lens to match distances from the geographic coordinate point of the location of camera lens to the geographic coordinate points determined for each of the different geographic areas.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
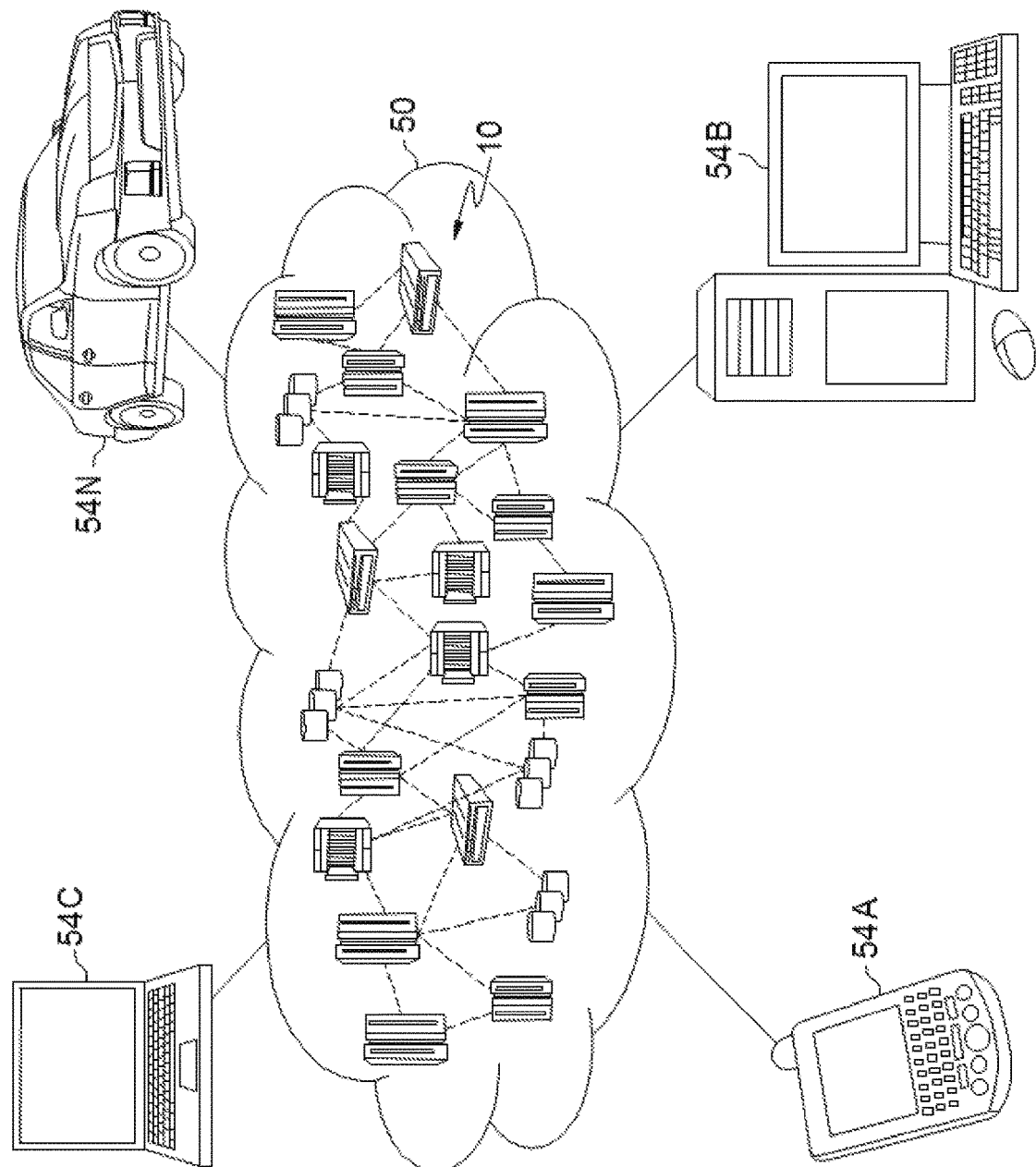
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
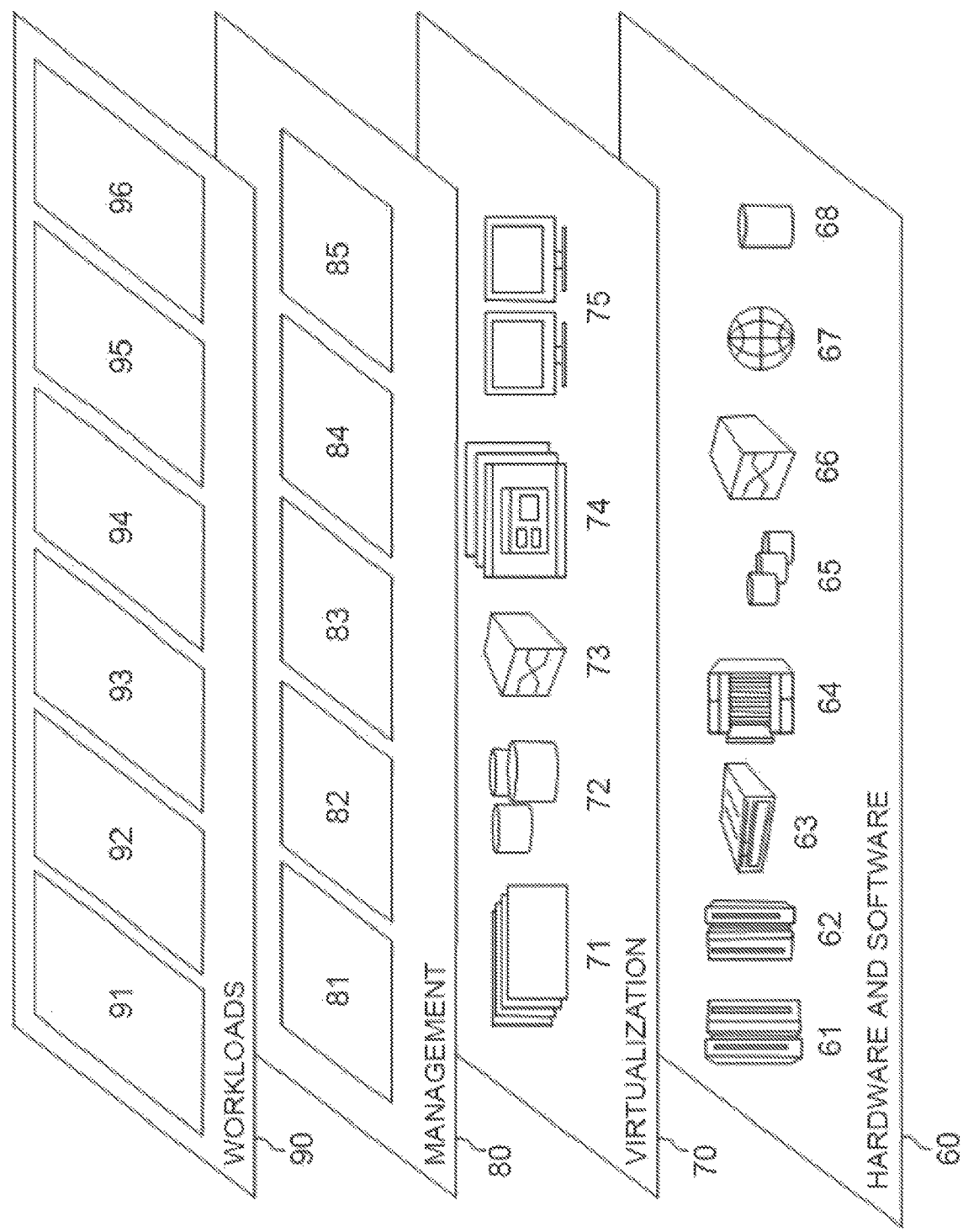
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for generating a panoramic image with a variable zoom setting according to aspects of the present invention 96.

Figure 3:
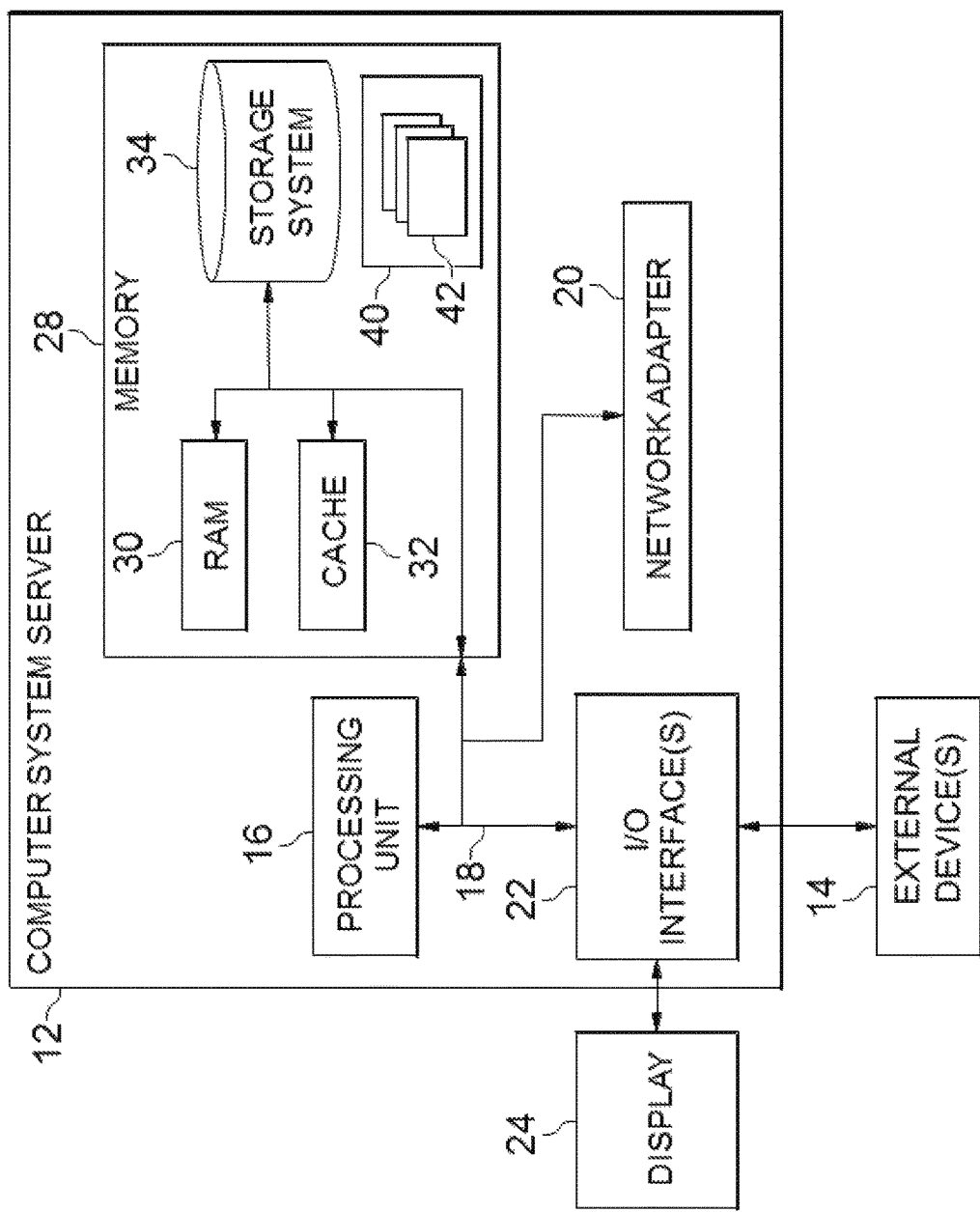
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
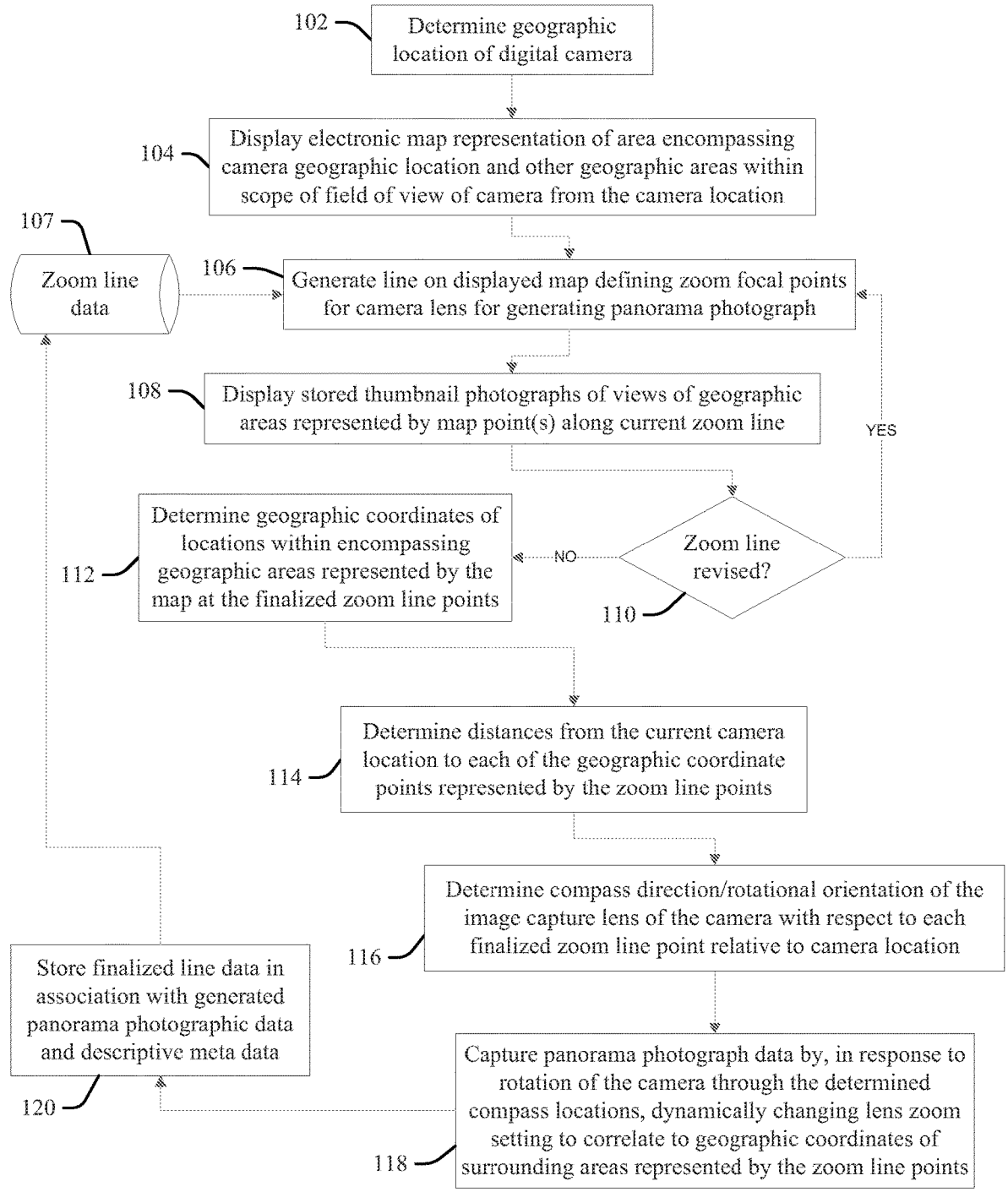
FIG. 4 is a flow chart illustration of an embodiment of the present invention.

FIG. 4 illustrates a system, process, or device according to an embodiment of the present invention. At 102 a processor that is configured according to the present invention (the "configured processor") of a digital camera or of some other device in communication with the camera determines or identifies a geographic location of the digital camera; for example, by use of a global positioning satellite (GPS) component or networked service that determines GPS coordinates of the camera, or via triangulation to two or more cellular services towers in cellular radio signal communication with the camera, and still other location techniques may be practiced.

In response to determining (identifying) the geographic location of the digital camera, at 104 the configured processor drives a graphical user interface (GUI) display to display an electronic map to a user of the camera that displays a two-dimensional (2-D) representation of an area encompassing the digital camera geographic location and other geographic areas that are within a scope of a field of view of the camera from the digital camera geographic location. In some embodiments, the GUI is a screen incorporated within or associated to the camera device, such as an LCD panel or a smart phone touch screen. The electronic map is generated by a mapping service or mapping software executing on the camera or other programmable device associated to the screen and is generally zoomable and can otherwise be re-sized, redrawn, revised or manipulated on the screen via GUI inputs from the user.

At 106 the configured processor generates a line on the displayed map for defining zoom focal points for a lens of the camera for generating panorama photograph. The generated line generally appears as an overlay on the map display, wherein the underlying map content is still visible to the user. The line may be drawn in response to inputs from the user to the GUI, for example, from an electronic pen or stylus device, a mouse cursor, a fingertip engagement of a touch screen GUI, etc. The line may also be generated from historic zoom line data selected by the user or otherwise retrieved from a data repository 107 (a local or network storage device or cloud storage resource or service, etc.), wherein the data defining the line is created by the current or other user in the past with respect to the same or a similar location.

Some embodiments provide an optional feature at 108 wherein the configured processor causes the GUI display to, in response to the user drawing the line in/on the electronic map, show stored thumbnail photographs of views of the geographic areas represented by the map at one or more points along the drawn, zoom setting line. Such thumbnails may be from any perspective, but views from the current location of the camera are generally preferred and used if available. The thumbnails may be generated or obtained from a variety of resources or services, including from the mapping software or service generating the map. The thumbnails function to provide the camera user a preview of image data obtainable within a panorama photograph at the focal point or zoom level of the drawn line, wherein the user may revise the line in response at 110, moving it inward or outward relative to the camera position in order to capture different image data within a generated photo, including as indicated by refreshing the thumbnail views at 108 in response to revisions to the zoom line.

Movement or revision of the line, including via selection of an alternate, historic line displayed from the zoom line data repository 107, at 110 may also cause different, historic lines to be displayed on the map 108, wherein the user can select a preferred one of the lines at 110, including in response to associated, displayed thumbnail photographs.

The thumbnail photographs shown as correlated to a line at 108 may be stored from previous photographs that are generated from the same camera location by the current line position, which is helpful to guide the user in drawing the line, or by selecting a new line from historic data: by seeing what has been done in the past in generating photographs, by the user or others, including social network contacts, family members, or the general public.

Aspects of the present invention transfer the drawn or selected line to the camera device to defined zoom focal distances for the camera. Each coordinate point on the line is sent to the user camera and for use in setting an automatic zoom component so that it dynamically varies zoom level as the camera is moved and the focal point of the camera travels along the line, thereby generating a picture that has zoom setting set up similarly to the picture chosen in the case of a thumbnail example. The user may make adjustments to the line, including in response to generating and choosing preferred thumbnail views relative to previous line iterations, wherein the embodiment thereby guides the user in drawing or revising the line to produce a better dynamic zoom level, including in response to historic line settings that generate preferred thumbnail views.

At 112 the configured processor determines geographic coordinate points (location and distance determinative values) of different locations within the surrounding geographic areas (hence, that are visible within the view of the camera lens) and represented on by map at each of the finalized zoom line points.

At 114 the configured processor determines distances from the current camera location to each of the geographic coordinate points represented by the zoom line points.

At 116 the configured processor determines via a compass device or component a rotational orientation or direction of the image capture lens of the camera with respect to each of the geographic coordinate points represented by the zoom line points.

At 118 the camera captures panorama photograph data by, in response to rotation of the camera through the determined compass locations while image capture elements are capturing image data through the camera lens, dynamically changing the lens zoom setting to match (correlate to, focus on, etc.) the geographic coordinates of the surrounding areas within the view of the camera lens that are represented by the finalized zoom line points (as correlated to the determined compass/rotational data orientations from camera location).

Thus, while the camera is capturing panoramic photographic data, the configured processor changes the zoom setting of the camera lens to match the zoom settings represented by the respective distances of the zoom line points to the camera lens. As the camera rotates through the different compass direction points, the configured processor determines the associated GPS locations of the areas represented by the zoom line, and thereby locations that the camera is focused upon and pointing to on the electronic map stored in memory and rendered on the GUI display. As such, it will then know exactly where the line is in relation to his current location distance wise and will zoom in or out as appropriate, according to the distance of the line. Therefore, based on direction of camera movement, the configured processor automatically calculates and sets or revises the zoom level to align with a focal distance from the camera lens that is aligned with the finalized zoom line.

At 120 the configured processor stores in the data repository 107 the finalized line data in association with the generated panorama photographic data and with descriptive meta data: illustrative but not limiting or exhaustive examples include user name, time and date of acquisition, camera location data, weather data, lighting data (including natural or artificial lighting), illumination level readings, lighting color spectrum, etc.). Thus, the storage of the line in association with the generated image data and the meta data enables sharing of the zoom line on social network or other web sites, wherein the user in the future, or other users, may search for and retrieve and use the generated line as a function of query terms drawn to the line metadata. Thus, a person that likes a resulted generated panorama photo or thumbnail thereof is enabled to set up their own camera to capture a photograph using the same line coordinates while at the same location, thus being able to capture a similar picture with his or her own camera, at his or her own time or convenience while at the same or similar location (within a threshold distance from the user camera location wherein a similar perspective is obtained).

Embodiments enable users to query or search directly from the camera device to find other lines drawn relative to the same or similar camera location, and thereby to view thumbnails indicating how others have drawn the obtained line and what resulting generated picture image data may look like. Some query results return a number (plurality) of sample photos and associated map zoom lines for consideration. For example, a query may return ten (10) popular sample panorama or other photos taken from the same GPS location or within a threshold distance of it, wherein the user may select a preferred one of the returned photos, wherein the configured processor responsively selects an associated zoom line and draws it on the map displayed to the user for approval for use in generating a photograph via the user camera at the present location.

Figure 5:
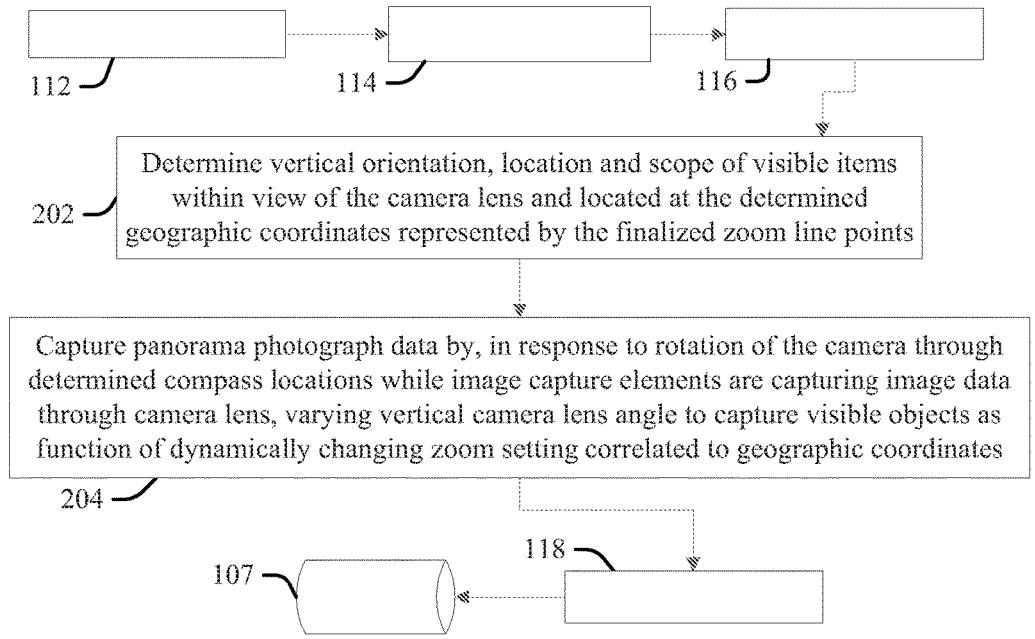
FIG. 5 is a block diagram illustration of another embodiment of the present invention.

FIG. 5 illustrates another embodiment of the present invention that further adjusts camera lens vertical angle relative to a horizontal perspective, and optionally associated focal lengths, in response to differences in altitude relative to the camera location of different physical elements or areas along the zoom line. Thus, in addition to the processes described in FIG. 4 at 112 of determining geographic coordinates of surrounding areas within view of the camera lens that are represented by the finalized zoom line points, at 114 of determining distances from the current camera location to each of the geographic coordinate points represented by the zoom line points, and at 116 of determining via a compass device or component a rotational orientation or direction of the image capture lens of the camera with respect to each of the geographic coordinate points represented by the zoom line points, at 202 the configured processor, determines, relative to a horizontal perspective reference, vertical orientation, location and span or scope (distance range along the vertical orientation) of a physical feature that is visible in the surrounding areas (hence, within the view of the camera lens) and located at the determined geographic coordinates represented by the finalized zoom line points.

At 204 the configured processor camera captures panorama photograph data by, in response to rotation of the camera through the determined compass locations while image capture elements are capturing image data through the camera lens, varying the vertical camera lens angle relative to the horizontal perspective to capture the visible objects located at the geographic coordinates determined for the zoom line points as a function of dynamically changing the lens zoom setting to correlate to the geographic coordinates represented by the finalized zoom line points (as correlated to the determined compass/rotational data orientations from camera location).

Thus, as discussed above with respect to FIG. 4, at 120 the configured processor stores in the data repository 107 the finalized line data in association with the generated panorama photographic data and with descriptive meta data.

Thus, the embodiment of FIG. 5 determines a span of a vertical perspective of an element located along one or more of the geographic coordinates determined for the zoom line points. This embodiment accounts for and considers differences in altitude of visible items within view of the camera lens, such as a lake surface located vertically below the camera location at a first point on the zoom line, and a cliff top towering above the current camera location that is visible at a different, second point along the zoom line. The embodiment recognizes the altitude difference between the position of the camera and the altitude of physical objects visible within the camera lens field of view at each point on the zoom line, and further determines the span or scope of the objects along this vertical orientation, for example as defined by the distance between upper and lower boundary values of the visible object along this vertical orientation, in order to adjust the zoom level calculated for the lens at the relevant (associated) determined geographic coordinates to capture an entirety of the visible object.

Thus, the zoom level may be adjusted at 204 in response to determining that the distance to a target visible object is short enough to where the adjustment to the camera zoom makes a difference. For example, a zoom level setting for a mountain face that is located along the determined geographic coordinates of the zoom line at a distance of 25 kilometers away will generally capture the entire mountain face without requiring the camera lens body to vary the vertical angle as the camera rotate relative to the zoom line.

In contrast, if the mountain face is located closer to the camera lens, such as 300 meters yards away, the configured processor determines at 204 that the camera lens (or body) must tilt upward, and set the zoom level for a distance to the middle of the mountain face relative to the upper and lower boundary points, in order to capture an image that includes the entirety of the mountain face within the panorama image data. Thus, embodiments change the vertical angle of the camera as needed as the camera rotates through the compass locations while capturing the image data, accounting for both distance and altitude adjustments required to capture image data for a physical object.

Embodiments automatically adjust tilt levels of the camera lens or body through use of an accelerometer at 204, a device built-in to many smart phones and other digital camera devices today that enables the configured processor to measure static angle of tilt or inclination. For example, in response to determining required adjustments to altitude, the accelerometer is used by the configured processor to measure and execute associated changes of the angle or tilt of the camera device or components (up or down), depending on a reference altitude determination for the location of the camera device as it rotates to capture the image data, as function of distance and altitude of the visible objects identified at the geographic coordinate points represented by the zoom line points.

Figure 6:
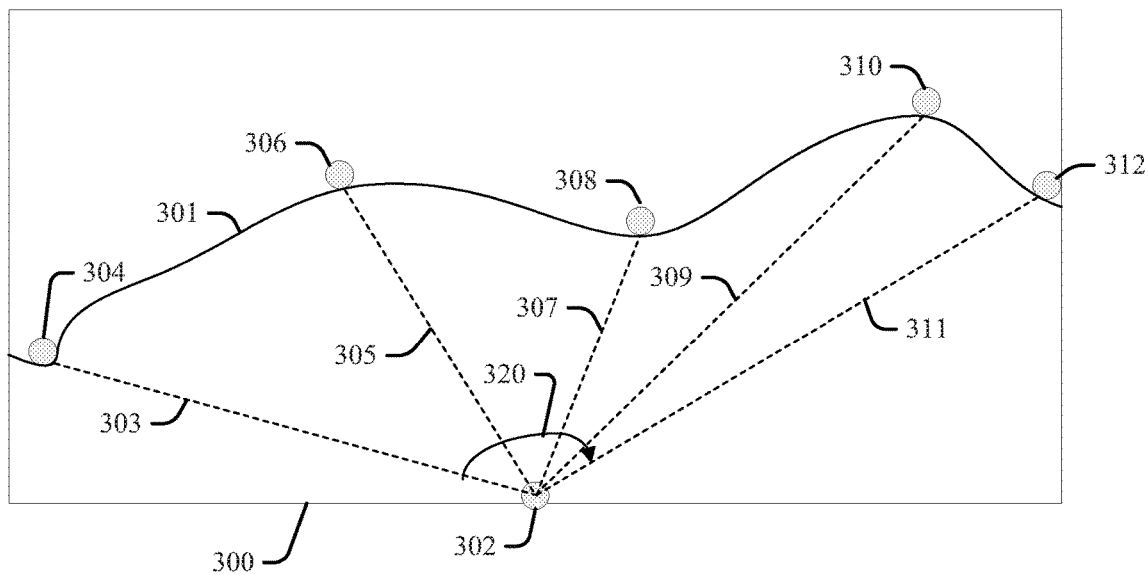
FIG. 6 is a graphic illustration of an implementation of an embodiment of the present invention.

FIG. 6 is a graphic illustration of a two-dimensional electronic map 300 that depicts a geographic area including the location of a digital camera 302, wherein a zoom line 301 that defines the scope of a panoramic photograph capture is drawn or selected by a camera user to include a plurality of different points of interest 304, 306, 308, 310 and 312 that represent visible objects of interest within the view of the camera. Thus, the camera 302 uses the zoom line 301 to dynamically select different, respective zoom focal length distances 303, 305, 307, 309 and 311 to capture panorama image data of the points of interest 304, 306, 308, 310 and 312 in response to rotating the camera is rotated about a clockwise direction 320 while capturing the image data (at 118 of FIG. 4 or 204 of FIG. 5). While capturing the panoramic photograph, the user moves the camera/mobile device wherein the zoom level is automatically recalculated based on the movement, position and direction of the camera relative to the geographic coordinate points represented by the zoom line points.

Embodiments may use mapping software, services or applications to enable the user to see the layout of the zoom line 301 as on the map display surface 300 in real-time while drawing or selecting the line 301, and wherein the user may dynamically revise the line 301 as necessary to more accurately capture any of different points of interest 304, 306, 308, 310 and 312.

Embodiments may also incorporate interactive pen tracking on screen displays used to render the map 300, such as in response to real-time inputs from a digital pen to a liquid crystal display (LCD) panel, wherein the user may write (draw a line) directly on the surface of the LCD panel or other screen that shows the electronic map 300.

By automatically recalculating zoom settings to align with the different locations of different items of interest within the scope of panoramic photograph, embodiments of the present invention ensure better (clearer and in-focus) coverage of the desired target areas in any given panoramic photograph relative to prior art panoramic methods and systems. This dynamic capability may also be shared with other user, through social network or other public or private forums, so that other users may benefit from using custom and optimized zoom line values in the capture of their own photographs.

While embodiments have been described with respect to panoramic photographs, aspects of the present invention may also be used to capture standard images, or 360-degree photo and video data.

Embodiments provide improvements to digital camera interface and management mechanisms, enabling users to quickly and easily define custom zoom lines to capture targeted items of interest within the camera field of view, by drawing electronic lines overlaying mapping software on a screen of or associated to the camera, which in turn controls camera lens setting operations to translate the user inputs into dynamically adjusting zoom settings as a panoramic picture is taken.

Via the use of meta tagging the image data or the electronic map with the drawn line to a photograph that is shared, embodiment enable another person that likes a photo taken by the user to easily set up his or her own camera to use the same zoom settings represented by the zoom line while at the same or a similar location, and thus to capture a similar picture with his or her own camera. The ease of use in deploying embodiments and their associated usability features allows users intuitive and complete control in setting up for panoramic shots, resulting in pictures that better meet the desires of a given user relative to prior art systems and methods.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
driving a graphical user interface display to display to a user of a digital camera a two-dimensional representation of a plurality of different geographic areas that are within a scope of a field of view of a lens of the camera;
determining geographic coordinate points for each of the different geographic areas and for a geographic location of the camera lens; and
capturing panorama photograph data via the camera lens in response to rotation of the camera, while dynamically changing a zoom setting of the lens to match distances from the geographic coordinate point of the location of camera lens to the geographic coordinate points determined for each of the different geographic areas.

2. The method of claim 1, further comprising:
determining horizontal compass rotational orientation locations of the camera lens in association with each of the geographic coordinate points determined for the different geographic areas; and
wherein the dynamically changing the zoom setting of the lens in response determining that the camera lens is rotating through the horizontal rotational orientation locations associated with the geographic coordinate points.

3. The method of claim 1, further comprising:
determining, relative to a horizontal perspective reference, a span of a vertical orientation of a physical feature that is visible at a first of the geographic coordinate points within the geographic areas; and
wherein the capturing the panorama photograph data via the camera lens in response to rotation of the camera comprises varying a vertical camera lens angle relative to the horizontal perspective to capture the span of the vertical orientation of the physical feature while dynamically changing the zoom setting of the lens to match a distance from the camera lens to the geographic coordinate point determined for the physical feature at the first point.

4. The method of claim 1, further comprising:
identifying at least one of the plurality of different geographic areas in response to an input from the user to the graphical user interface display that is selected from the group consisting of:
a fingertip engagement input to a touch screen structure of the graphical user interface display;
a mouse cursor input; and
an electronic stylus device input.

5. The method of claim 1, further comprising:
identifying one of the plurality of different geographic areas in response to a selection of historic data saved from generation of a historic panorama photographic image data at a geographic location that is similar to a geographic area attribute of the camera lens location.

6. The method of claim 5, further comprising:
driving the graphical user interface display to display an electronic map to the user of a digital camera, wherein the map comprises a two-dimensional representation of a geographic area encompassing the different geographic areas;
generating a line of zoom focal distance points displayed on the map that comprises each of the each of the geographic coordinate points determined for the different geographic areas; and
capturing the panorama photograph data via the camera lens in response to the rotation of the camera while dynamically changing the zoom setting of the lens to match distances from the geographic coordinate point of the location of camera lens to each of the geographic coordinate points determined for each of the different geographic areas that are located on the line of zoom focal distance points displayed on the map.

7. The method of claim 6, further comprising:
   displaying a thumbnail photograph of a view of the one of the identified one of the geographic areas that is associated in the historic data to a corresponding one of the line zoom focal distance points; and
   sharing the line with social network contacts of the user as a function of meta data generated in the capturing the panorama photograph data.

8. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the driving the graphical user interface display to display to the user the two-dimensional representation of the plurality of different geographic areas, the determining the geographic coordinate points for each of the different geographic areas and for the geographic location of the camera lens, and the capturing panorama photograph data via the camera lens.

9. The method of claim 8, wherein the computer-readable program code is provided as a service in a cloud environment.

10. A computer system, comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:
    drives a graphical user interface display to display to a user of a digital camera a two-dimensional representation of a plurality of different geographic areas that are within a scope of a field of view of a lens of the camera;
    determines geographic coordinate points for each of the different geographic areas and for a geographic location of the camera lens; and
    captures panorama photograph data via the camera lens in response to rotation of the camera, while dynamically changing a zoom setting of the lens to match distances from the geographic coordinate point of the location of camera lens to the geographic coordinate points determined for each of the different geographic areas.

11. The system of claim 10, wherein the processor executes the program instructions stored on the computer-readable storage medium via the computer readable memory and thereby:
    determines horizontal compass rotational orientation locations of the camera lens in association with each of the geographic coordinate points determined for the different geographic areas; and
    dynamically changes the zoom setting of the lens in response determining that the camera lens is rotating through the horizontal rotational orientation locations associated with the geographic coordinate points.

12. The system of claim 10, wherein the processor executes the program instructions stored on the computer-readable storage medium via the computer readable memory and thereby:
    determines, relative to a horizontal perspective reference, a span of a vertical orientation of a physical feature that is visible at a first of the geographic coordinate points within the geographic areas; and
    captures the panorama photograph data via the camera lens in response to rotation of the camera by varying a vertical camera lens angle relative to the horizontal perspective to capture the span of the vertical orientation of the physical feature while dynamically changing the zoom setting of the lens to match a distance from the camera lens to the geographic coordinate point determined for the physical feature at the first point.

13. The system of claim 10, wherein the processor executes the program instructions stored on the computer-readable storage medium via the computer readable memory and thereby identifies at least one of the plurality of different geographic areas in response to an input from the user to the graphical user interface display that is selected from the group consisting of:
    a fingertip engagement input to a touch screen structure of the graphical user interface display;
    a mouse cursor input; and
    an electronic stylus device input.

14. The system of claim 10, wherein the processor executes the program instructions stored on the computer-readable storage medium via the computer readable memory and thereby identifies one of the plurality of different geographic areas in response to a selection of historic data saved from generation of a historic panorama photographic image data at a geographic location that is similar to a geographic area attribute of the camera lens location.

15. The system of claim 10, wherein the processor executes the program instructions stored on the computer-readable storage medium via the computer readable memory and thereby:
    drives the graphical user interface display to display an electronic map to the user of a digital camera, wherein the map comprises a two-dimensional representation of a geographic area encompassing the different geographic areas;
    generates a line of zoom focal distance points displayed on the map that comprises each of the each of the geographic coordinate points determined for the different geographic areas; and
    captures the panorama photograph data via the camera lens in response to the rotation of the camera while dynamically changing the zoom setting of the lens to match distances from the geographic coordinate point of the location of camera lens to each of the geographic coordinate points determined for each of the different geographic areas that are located on the line of zoom focal distance points displayed on the map.

16. A computer program product, comprising:
    a computer readable storage medium having computer readable program code embodied therewith, the computer readable program code comprising instructions for execution by a processor that cause the processor to:
    drive a graphical user interface display to display to a user of a digital camera a two-dimensional representation of a plurality of different geographic areas that are within a scope of a field of view of a lens of the camera;
    determine geographic coordinate points for each of the different geographic areas and for a geographic location of the camera lens; and
    capture panorama photograph data via the camera lens in response to rotation of the camera, while dynamically changing a zoom setting of the lens to match distances from the geographic coordinate point of the location of camera lens to the geographic coordinate points determined for each of the different geographic areas.

17. The computer program product of claim 16, wherein the computer readable program code instructions for execution by the processor further cause the processor to:
   determine horizontal compass rotational orientation locations of the camera lens in association with each of the geographic coordinate points determined for the different geographic areas; and
   dynamically change the zoom setting of the lens in response determining that the camera lens is rotating through the horizontal rotational orientation locations associated with the geographic coordinate points.

18. The computer program product of claim 16, wherein the computer readable program code instructions for execution by the processor further cause the processor to:
   determine, relative to a horizontal perspective reference, a span of a vertical orientation of a physical feature that is visible at a first of the geographic coordinate points within the geographic areas; and
   capture the panorama photograph data via the camera lens in response to rotation of the camera by varying a vertical camera lens angle relative to the horizontal perspective to capture the span of the vertical orientation of the physical feature while dynamically changing the zoom setting of the lens to match a distance from the camera lens to the geographic coordinate point determined for the physical feature at the first point.

19. The computer program product of claim 16, wherein the computer readable program code instructions for execution by the processor further cause the processor to identify at least one of the plurality of different geographic areas in response to an input from the user to the graphical user interface display that is selected from the group consisting of:
   a fingertip engagement input to a touch screen structure of the graphical user interface display;
   a mouse cursor input; and
   an electronic stylus device input.

20. The computer program product of claim 16, wherein the computer readable program code instructions for execution by the processor further cause the processor to:
   drive the graphical user interface display to display an electronic map to the user of a digital camera, wherein the map comprises a two-dimensional representation of a geographic area encompassing the different geographic areas;
   generate a line of zoom focal distance points displayed on the map that comprises each of the each of the geographic coordinate points determined for the different geographic areas; and
   capture the panorama photograph data via the camera lens in response to the rotation of the camera while dynamically changing the zoom setting of the lens to match distances from the geographic coordinate point of the location of camera lens to each of the geographic coordinate points determined for each of the different geographic areas that are located on the line of zoom focal distance points displayed on the map.

\* \* \* \* \*